United States Patent [19]

Call, Sr.

[11] 4,124,186

[45] Nov. 7, 1978

[54] FURNITURE ANGLE BRACE AND JOINT FORMED THEREWITH

[76] Inventor: Gerald A. Call, Sr., Rte. 2, Box 330, Monroe, N.C. 28110

[21] Appl. No.: 767,513

[22] Filed: Feb. 10, 1977

[51] Int. Cl.² ........................................... F16M 11/16
[52] U.S. Cl. ................................... 248/188; 403/231
[58] Field of Search .................... 248/188; 403/231; 85/11, 13

[56] References Cited

U.S. PATENT DOCUMENTS

| | | | |
|---|---|---|---|
| 313,295 | 3/1885 | Beach | 248/188 |
| 577,229 | 2/1897 | Bosch | 248/188 |
| 626,554 | 6/1899 | McLean | 248/188 |
| 1,630,521 | 5/1927 | Bolin | 248/188 |

FOREIGN PATENT DOCUMENTS

| | | | |
|---|---|---|---|
| 312,896 | 7/1969 | Sweden | 248/188 |
| 480,044 | 12/1969 | Switzerland | 248/188 |

*Primary Examiner*—Roy D. Frazier
*Assistant Examiner*—Peter A. Aschenbrenner
*Attorney, Agent, or Firm*—Richards, Shefte & Pinckney

[57] ABSTRACT

A furniture angle brace that has a central bracing portion from which a pair of flat flanges extend angularly with two flat rectangular tabs projecting generally perpendicularly from each flange for assembly in a furniture joint to secure a leg and two side members together with the flat flanges flat against the side members and the tabs seated in slightly smaller cylindrical bores in the side members for receiving alignment with the tabs for indenting side edge-to-cylindrical surface seating of the tabs in the bores. The brace is secured to the side members and leg by screws that fix the brace flanges to the side members and by a screw or bolt that draws the central portion of the brace toward the leg and thereby secures the side members to the leg with the tab and bore connections providing proper configuration of the parts and rigidifying the completed joint.

10 Claims, 10 Drawing Figures

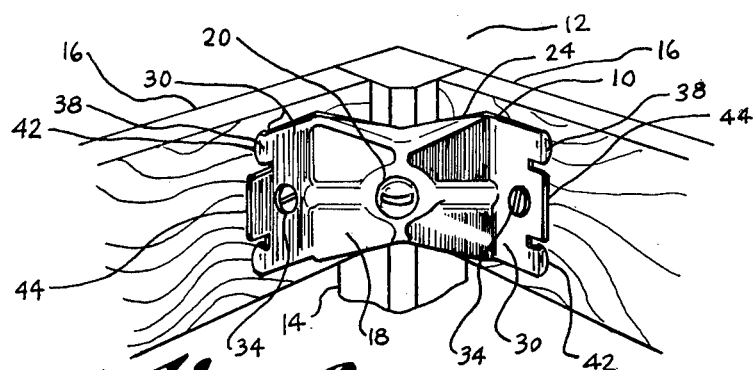
Fig. 6
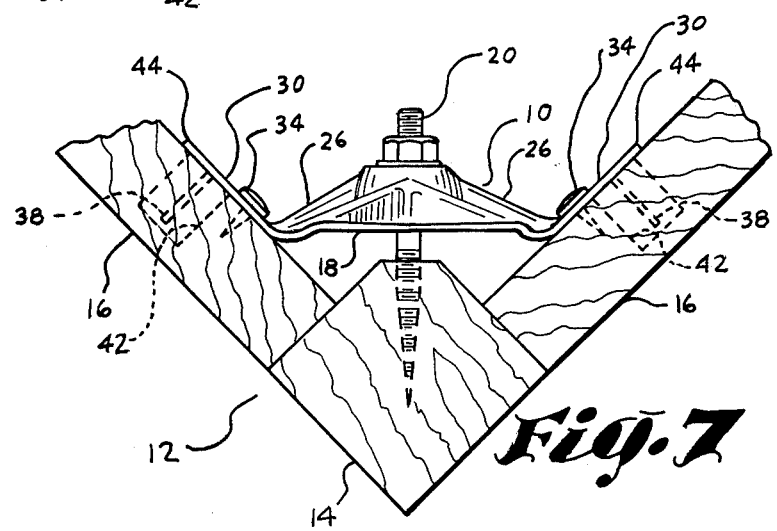
Fig. 7
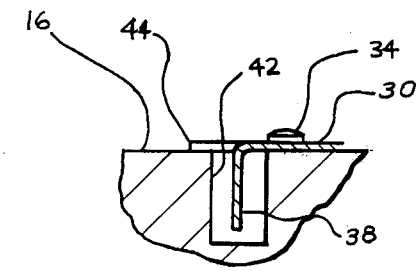
Fig. 8
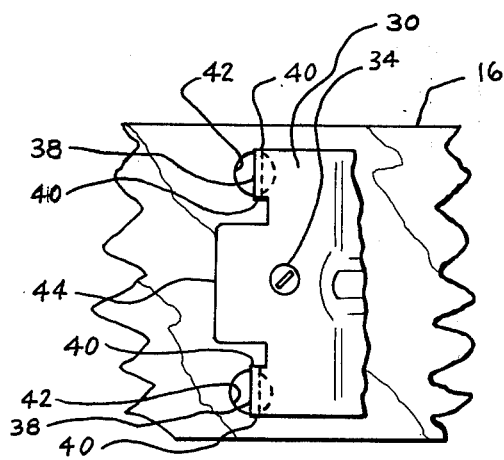
Fig. 9
Fig. 10

FURNITURE ANGLE BRACE AND JOINT FORMED THEREWITH

BACKGROUND OF THE INVENTION

The present invention is directed to a furniture angle brace and more particularly to a brace used to secure two side apron members and a leg of furniture together in assembled relation.

Furniture braces of this general type are commonly used to secure side apron rails and legs together in the manufacture of piano benches, tables and other articles of furniture. An example of a prior art brace of this type has a central bracing portion, a pair of flat surface portions extending from the opposite edges of the central bracing portion for flat abutment against furniture side members, and inturned straight flanges extending perpendicularly from the flat surface portions into straight slots cut in the furniture side members. This flange and slot engagement serves to retain the brace and side members in assembled relation with the leg of the joint but it is susceptible to possible vertical misalignment as the flange will fit anywhere along the slot, it depends on screws alone to transfer a sitter's weight from side members to leg, the slot weakens the side member and may result in breaking away of the end of the side member, and the necessary tolerance in the slot can produce wobbling of the parts in the joint.

Another example of a prior art furniture brace is disclosed in Bolin U.S. Pat. No. 1,630,521, which shows a brace having a body portion with hooks that project into cylindrical holes in side rails of the furniture joint, with the hooks having converging lateral edges that bite into the walls of the holes in angular relation to the axes of the holes by tightening action on the screw connecting the brace to the leg while both side members are held in relation only when assembled with the leg, precluding a knock-down or partial assembly for convenient storage and shipping. This biting of the hooks in the side rail holes serves to retain the parts of the joint in assembled relation but is susceptible of possible angular misalignment of the side rail with the brace and possible planar misalignment by misalignment of the hooks in the holes or non-uniform biting of the edges of the hooks in the holes, without any self-aligning feature of the brace or joint preparation.

In contrast to the prior art the brace of the present invention provides and assures proper angular and planer self-alignment of the parts of the joint in which it is used, permits preassembly of side members and brace before introduction of the leg and its screw into the assembly for the inherent advantages thereof as well as allowing knocked-down shipment for later unskilled assembly of legs, has no tendency to split out lengthwise portions of the side members by chisel action of hooks lengthwise of the grain of the wood thereof, rigidifies the completed joint against possible wobbling in any direction, and is advantageous for shipment of furniture either knocked-up or knocked-down.

SUMMARY OF THE INVENTION

Briefly described, the furniture angle brace of the present invention has a central bracing portion, a pair of spaced flanges extending angularly from the bracing portion, and at least two spaced flat locking tabs projecting from each of the flanges for generally perpendicular substantially full lateral edgewise engagement in corresponding separate preformed recesses in furniture side members to lock the side members in rigid assembled relation. Means are included to accommodate securement of the flanges to the side members and the central bracing portion to the leg, for forming a rigid joint with the locking tabs assuring proper alignment of the parts and imparting enhanced rigidity.

Preferably, the flanges are generally perpendicular to each other, and the locking tabs are generally rectangular in flatwise shape and project generally perpendicularly to the flanges which are flat for flat abutment against the vertical sides of the side members so that the locking tabs projecting from one flange are generally perpendicular to those projecting from the other flange. In the preferred embodiment, two locking tabs extend transversely of each flange, each flange has a tongue portion between the tabs and extending beyond them for flatwise engagement of the adjacent side member, and each locking tab has two generally parallel edges extending generally perpendicularly from the flange from which it projects.

This furniture angle brace is preferably assembled with side members and a leg to form the furniture joint of this invention, in which the side members each have spaced recesses preformed therein, and the angle brace has at least two locking tabs projecting from each of its flanges for generally perpendicular engagement seated in the spaced recesses in the side members for locking them in rigid assembled relation, while means are provided for securing the flanges to the side members and for securing the central bracing portion of the angle brace to the leg. Preferably the side member recesses are spaced in receiving alignment with the tabs for side edge seating engagement of the tabs in the recesses, and the width of the tabs between their side edges is slightly greater than the corresponding dimensions of the recesses for surface indenting engagement in the recesses. In the preferred embodiment, two recesses forming cylindrical bores extend perpendicularly into each side member corresponding to and aligned with the two locking tabs projecting from each flange, each flange has a tongue portion between the tabs and extending therebeyond for flatwise engagement of the side member, and the tabs are generally centered in the bores and have generally parallel side edges which are seated indentingly against the cylindrical surfaces of the bores at opposite sides thereof.

Another preferred embodiment differs only in that the locking tabs are generally aligned with the cylindrical bores in flatwise direction but are spaced closer together than the bores for suitable indenting contact of the outside edges of the tabs with the farthest cylindrical surfaces of the bores and with suitably heavier indenting contact of the inside edges of the tabs with the nearest cylindrical surfaces of the bores for greater locking contact therewith and for compressing the side member between the tabs.

With this construction the tab and bore alignment and side edge-to-cylindrical surface engagement and indentation assure proper alignment of the parts of the joint and rigidify the joint against possible wobbling, with no significant weakening of the side members in accommodating the interengagement.

BRIEF DESCRIPTION OF THE DRAWINGS

FIG. 6 is an enlarged perspective view of one of the braces and joints of the piano bench of FIG. 1;

FIG. 7 is a plan view of the brace of FIG. 6;

FIG. 8 is an elevational view of the left flange portion of the brace and joint as shown in FIG. 6;

FIG. 9 shows an alternative arrangement similar to FIG. 8; and

FIG. 10 is a horizontal sectional view taken along line 10—10 of FIG. 8.

DESCRIPTION OF THE PREFERRED EMBODIMENT

Figure 1:
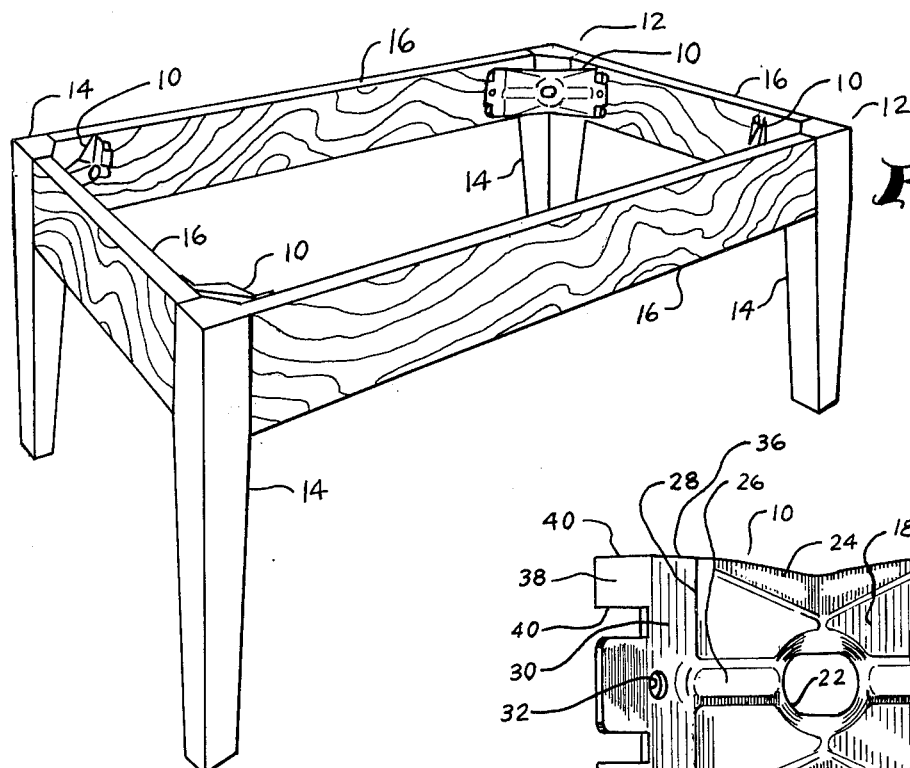
FIG. 1 is a perspective view of the assembled legs and side rails of a piano bench incorporating angle braces and joints according to the preferred embodiment of the present invention.
Figure 2:
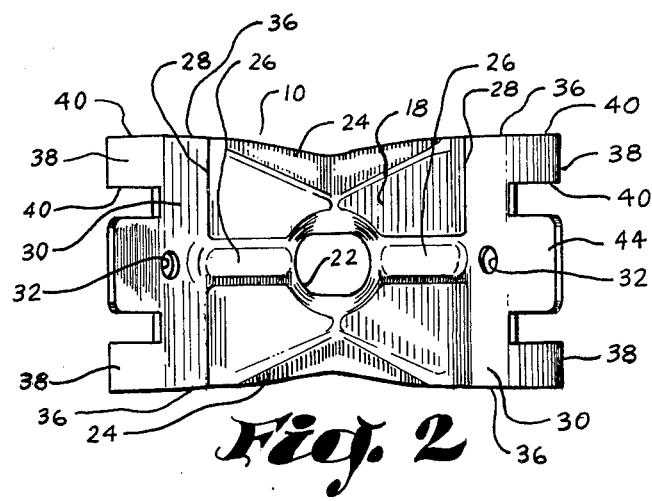
FIG. 2 is an enlarged front elevational view of one of the angle braces of the piano bench of FIG. 1.
Figure 3:
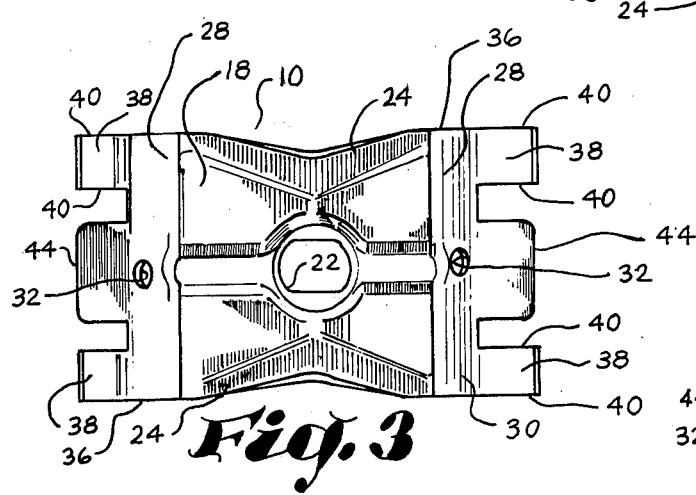
FIG. 3 is an enlarged rear elevational view of the brace of FIG. 2.
Figure 4:
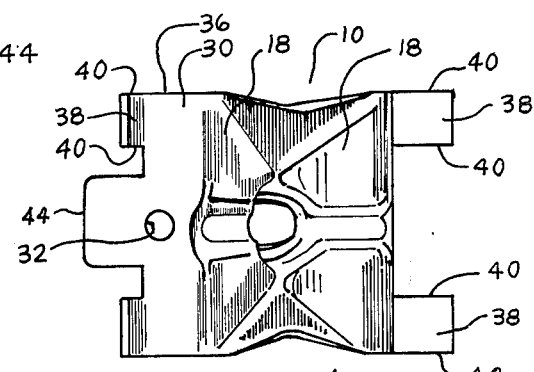
FIG. 4 is an elevational view of the rear of the brace of FIG. 3 taken at a 45° from the left in FIG. 3.
Figure 5:
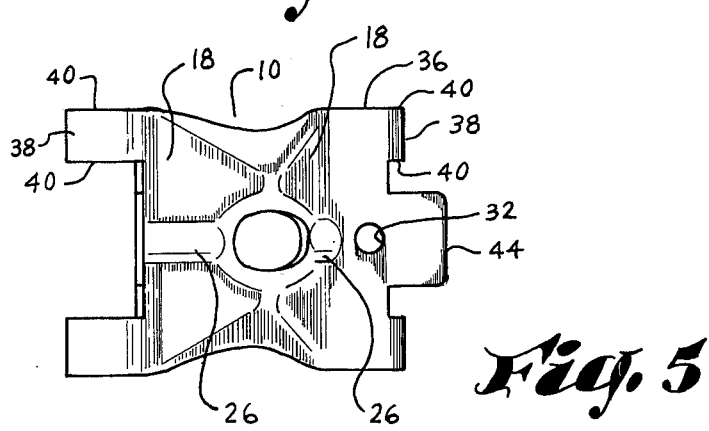
FIG. 5 is an elevational view of the front of the brace of FIG. 2 taken at a 45° angle from the left in FIG. 2.

In the preferred embodiment of the present invention, as illustrated in the accompanying drawings, the metal brace 10 of the present invention is shown incorporated in joints 12 that secure the legs 14 and side members 16 such as wooden apron rails of a piano bench together to form a rigidly assembled article of furniture. The brace 10 has an elongated central bracing portion 18 that extends diagonally between adjacent side rails 16 at each of the legs 14. This central portion 18 provides the main bracing function of the brace and is secured to the adjacent leg 14 by a large screw or hanger belt 20 that extends through a screw opening 22 in the center of the central bracing portion 18, with the screw 22 serving to draw the leg and brace together to bind the side rails 16 in an assembled joint condition. For strengthening purposes the central bracing portion 18 is angular in cross section both longitudinally and laterally at midpoint and has inturned top and bottom sides 24 and central cross ribs 26 extending longitudinally thereof between the end edges 28 of the central bracing portion 18 that abut the side rails 16.

A pair of flat flanges 30 project lengthwise from the end edges 28 of the central bracing portion 18 angularly at an angle of 45° from the general extent of the central bracing portion 18 and are spaced apart thereby. These flanges 30 have generally the same width as the central bracing portion 18 and abut the side rails 16 in flat engagement therewith and with the 45° angular relationship provide a mutually perpendicular relation of the flanges to form a right angle joint of the side rails 16. Each flange 30 is provided with a central screw opening 32 through which a screw 34 extends for securement of the flanges 30 to the side rails 16.

Projecting generally perpendicularly from the edges 36 of each flange 30 and transversely thereof are two spaced flat rectangular locking tabs 38 that are spaced longitudinally from the central bracing portion 18, and have two each generally parallel side edges 40 extending generally perpendicularly from the flange 30 and outwardly with respect to the brace 10 into one side rail 16 of the joint 12. The two rectangular locking tabs 38 projecting from one flange 30 are generally perpendicular to the two tabs 38 projecting from the other flange 30 of the brace 10, and all tabs 38 are seated in corresponding spaced recesses 42 preformed in the side rails 16 in receiving alignment with the locking tabs 38. In the form illustrated, the recesses 42 are cylindrical bores drilled into the side rails 16 perpendicular to the surfaces thereof so as to have axes aligned concentrically with the rectangular tabs 38. The diameter of the bores 42 is suitably slightly smaller than the width between the side edges 40 of the tabs 38 to provide parallel side edge-to-cylindrical surface seating contact and indenting expanding substantially full lateral edgewise engagement of the tabs 38 along the full length of the edges 40 in the bores 42 at opposite sides of each bore 42 for substantially rigid engagement by binding and pinching yet avoiding splitting the side rail 16 by excessive expanding force therein. Typically, the tabs 38 may be 9.75 mm. wide and the bores 42 may be 0.75 mm. smaller in diameter than the width of the tabs 38.

In an alternative preferred embodiment, as shown in FIG. 9, the tabs 38 may be spaced closer in edgewise direction thereof than the bores 42, thereby achieving a heavier locking action with the bore surfaces at the inner side edges of the tabs 38 than at the outer side edges thereof and compressing the side rail 16 therebetween.

The bores 42 are spaced from the ends of the side rails 16 a distance sufficient to cause the tabs 38 to clamp and retain the side rails 16 against the leg 14 when the large screw 20 is tightened to draw the central bracing portion 18 toward the leg 14, thereby rigidifying and properly positioning and retaining the side rails 16 and leg 14 into a tight locked joint with the tab and bore connection centering the side rails 16 in proper assembled relation and providing enhanced rigidity of the joint without significant weakening of the side rails 16, not entirely dependent on screws for supporting weight or holding in place, that substantially eliminates any problem of wobbling during use from side or endwise movements back and forth, from foot-like pivoting, or form torquing.

For further rigidity, the flanges 30 extend between and beyond the tabs 38 to form tongue-like extensions 44 flat with the flanges for increased footing securement of the flanges against the side rails 16, thereby cooperating with the remainders of the flanges to prevent pivoting of the side rails about the tabs 38.

It is to be understood that the foregoing detailed description and illustration of the preferred embodiment of the present invention is provided for disclosure purposes only and that various modifications are contemplated within the scope of the present invention, which is intended to be limited only by the scope of the appended claims.

I claim:

1. A furniture angle brace for securing two side members and a leg in assembled relation, said brace comprising a central bracing portion, a pair of flanges extending angularly from said bracing portion for flatwise engagement of adjacent side members, at least two spaced flat locking tabs projecting generally perpendicularly from each of said flanges for generally perpendicular engagement in the side members by substantially full lateral edgewise engagement in corresponding separate preformed recesses therein to lock the side members in rigid assembled relation, and means for accommodating securement of said flanges to the side members and said bracing portion to a furniture leg.

2. A furniture angle brace according to claim 1 and characterized further in that said flanges are flat for flat abutment against the vertical sides of the side members and in that said locking tabs are rectangular-shaped and extend transversely of said flanges.

3. A furniture angle brace according to claim 1 and characterized further in that said flanges are generally perpendicular to each other and the locking tabs projecting from one of said flanges are generally perpendicular to the locking tabs projecting from the other of said flanges.

4. A furniture angle brace according to claim 1 and characterized further by each of said locking tabs having two generally parallel edges extending generally perpendicularly from said flange from which it projects.

5. A furniture joint comprising a leg, two side members each having spaced recesses preformed therein, an angle brace for securing said leg and side members together in assembled relation, said brace having a central bracing portion and a pair of spaced flanges extending angularly from said bracing portion for flatwise engagement of adjacent side members with at least two spaced flat locking tabs projecting generally perpendicularly from each of said flanges for generally perpendicular engagement in the side members by substantially full lateral edgewise engagement in said preformed recesses therein to lock the side members in rigid assembled relation, said tabs being seated in said spaced recesses, means for securing said flanges to said side members, and means for securing said central bracing portion to said leg.

6. A furniture joint according to claim 5, and characterized further in that the width of said tabs between side edges thereof is slightly greater than the corresponding dimensions of said recesses for surface indenting engagement in said recesses.

7. A furniture joint according to claim 6, and characterized further in that said side member recesses are cylindrical bores extending perpendicularly into said side members and said locking tab side edges are generally parallel and are seated indentingly against the surfaces of said bores to rigidly retain said side members against said leg.

8. A furniture joint according to claim 7, and characterized further by each of said rectangular locking tabs being generally centered within the side member bore in which it is seated and its said side edges are indenting contact with the cylindrical surface of said bore at opposite sides thereof.

9. A furniture joint according to claim 7, and characterized further by two said rectangular locking tabs projecting from each of said flanges, two cylindrical bores in each said side member corresponding to and aligned with said tabs, each of said tabs being generally centered within the side member bore in which it is seated and its said side edges being in indenting contact with the cylindrical surface of said bore at opposite sides thereof, and each said flange having a tongue portion between said tabs and extending therebeyond for flatwise engagement of adjacent side members.

10. A furniture joint according to claim 7, and characterized further by two said rectangular locking tabs projecting from each of said flanges, two cylindrical bores in each side member corresponding to said two tabs, said tabs being generally aligned with said bores in flatwise direction and said tabs being spaced closer together than said bores for suitable indenting contact of the outside edges of said tabs with the farthest cylindrical surfaces of said bores and with suitably heavier indenting contact of the inside edges of said tabs with the nearest cylindrical surfaces of said bores for greater locking contact therewith and for compressing said side member therebetween.

* * * * *

UNITED STATES PATENT OFFICE
CERTIFICATE OF CORRECTION

Patent No. 4,124,186    Dated November 7, 1978

Inventor(s) Gerald A. Call, Sr.

It is certified that error appears in the above-identified patent and that said Letters Patent are hereby corrected as shown below:

Column 3, line 6, after "45°" insert --angle--.
Column 6, line 7, after "are" insert --in--.

Signed and Sealed this

Nineteenth Day of June 1979

[SEAL]

Attest:

RUTH C. MASON
Attesting Officer

DONALD W. BANNER
Commissioner of Patents and Trademarks